(12) United States Patent
Andrews et al.

(10) Patent No.: US 11,890,872 B2
(45) Date of Patent: Feb. 6, 2024

(54) AEROSOL JET PRINTER PROVIDING IN-FLIGHT AEROSOL CHARACTERIZATION

(71) Applicant: Wisconsin Alumni Research Foundation, Madison, WI (US)

(72) Inventors: Joseph Andrews, Madison, WI (US); Scott Sanders, Madison, WI (US); Mario Trujillo, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 234 days.

(21) Appl. No.: 17/404,345

(22) Filed: Aug. 17, 2021

(65) Prior Publication Data
US 2023/0057395 A1 Feb. 23, 2023

(51) Int. Cl.
| | | |
|---|---|---|
| *B41J 2/07* | (2006.01) | |
| *B41J 2/01* | (2006.01) | |
| *B41J 2/17* | (2006.01) | |
| *B41J 2/175* | (2006.01) | |
| *B41J 2/125* | (2006.01) | |
| *G01N 15/14* | (2006.01) | |

(52) U.S. Cl.
CPC . *B41J 2/07* (2013.01); *B41J 2/01* (2013.01); *B41J 2/125* (2013.01); *B41J 2/175* (2013.01); *B41J 2/1714* (2013.01); *G01N 15/14* (2013.01); *G01N 2015/1409* (2013.01)

(58) Field of Classification Search
CPC ..... B41J 2/07; B41J 2/01; B41J 2/1714; B41J 2/175; B41J 2/125; G01N 15/14; G01N 2015/1409
See application file for complete search history.

(56) References Cited

FOREIGN PATENT DOCUMENTS

JP 2013210270 A * 10/2013 ............. G01N 15/14

OTHER PUBLICATIONS

In situ sensor-based monitoring and computational fluid dynamics (CFD) modeling of Aerosol Jet printing (AJP) process. In international Manufacturing Science and Engineering Conference, vol. 4903, p. V002T04A049. American Society of Mechanical Engineering, 2016, pp. 1-13; Virginia, US. IDS NPL citation No. 1.*
In situ sensor-based monitoring and computational fluid dynamics (CFD) modeling of Aerosol Jet printing (AJP) process. In international Manufacturing Science and Engineering Conference, vol. 4903, p. V002T04A049. American Society of Mechanical Engineering, 2016, pp. 1-13; Virginia, US. U.S. IDS NPL citation No. 1.*
Salary, Roozbeh et al.; "In situ sensor-based monitoring and computational fluid dynamics (CFD) modeling Aerosol Jet printing (AJP) process." In International Manufacturing Science and Engineering Conference, vol. 49903, p. V002T04A049. American Society of Mechanical Engineers, 2016. pp. 1-13; Virginia US.

* cited by examiner

*Primary Examiner* — Yaovi M Ameh
(74) *Attorney, Agent, or Firm* — Boyle Fredrickson SC (57) ABSTRACT

An aerosol jet printer producing a stream of droplets in a print jet employs direct, droplet-resolving imaging to characterize the statistics of the droplets in flight for improved control of the printed line characteristics.

18 Claims, 4 Drawing Sheets

AEROSOL JET PRINTER PROVIDING IN-FLIGHT AEROSOL CHARACTERIZATION

STATEMENT REGARDING FEDERALLY SPONSORED RESEARCH OR DEVELOPMENT

—

CROSS REFERENCE TO RELATED APPLICATION

—

Background of the Invention

The present invention relates to aerosol jet printing and in particular to improved control system for aerosol jet printers.

Aerosol jet printing uses a directed aerosol stream of print liquid to deposit material directly on a substrate in a printed pattern. An example aerosol jet printer employs a reservoir of print liquid providing a printing material in a carrier liquid, for example, solvent. The print liquid is aerosolized, for example, by an ultrasonic atomizer positioned in line with a flow of carrier gas, and the aerosol of carrier gas and print liquid pass to a print nozzle that directs a jet of aerosolized material toward the substrate. The jet is focused, typically to be smaller than the nozzle diameter, through the use of a sheath gas which surrounds the jet as it exits the nozzle to corral the jet.

The atomized material in the jet travels a few millimeters from the jet nozzle to the substrate where the carrier liquid evaporates leaving the printing material. Motion of the print nozzle over the substrate allows arbitrary patterns to be printed in single or multiple layers, the latter allowing three-dimensional structures to be fabricated.

The ability to tightly deposit a pattern of print material on the substrate, necessary for high resolution printing, is a complex function of the qualities of the print liquid, nozzle design, atomization process, environmental temperature and humidity, print speed, and gas flows. Typically, these and other factors combine to produce a substantial variation in print resolution between printing tasks or during a prolonged printing operation.

It is known to provide real-time imaging of a printed line produced by the printer, for example, using a camera focused on the substrate. Images from the camera can be used to deduce a line width as well as other properties of the line, such as line consistency and density, edge smoothness, overspray, and the like. It is contemplated that these measurements of the printed line can be used for a feedback control of the printer process to provide improved printing consistency.

SUMMARY OF THE INVENTION

While real-time measurement of the printed line of an aerosol jet printer provides a good indication of whether the printing process is correctly configured, the complexity of the printing process means that this endpoint measurement may not uniquely indicate the necessary process variables that need to be adjusted when print line quality decreases. The present invention makes a droplet field measurement of the aerosol jet from the nozzle before it is deposited on the substrate, this droplet field measurement allowing the characterization, on a droplet-by-droplet basis, of velocity and mass distributions. It is believed that the information from these distributions, lost after material is deposited on the substrate, allows superior control of the process variables that ultimately affect line quality In one embodiment, the invention provides an aerosol jet printer having a print liquid reservoir holding a liquid to be printed. An atomizer receives a carrier gas and the liquid to be printed to provide an aerosol of the print liquid having print liquid droplets in the carrier gas. A print nozzle movable with respect to a substrate receives the aerosol and a shield gas and directs the aerosol toward a substrate as a jet as enveloped by the shield gas. A droplet field camera resolves print liquid droplets in the jet as it moves toward the substrate providing images to a control system controlling a flow of aerosol and shield gas and the movement of the print nozzle with respect to the substrate. Distributions of print liquid droplet properties from the images permits control of at least one of the carrier gas flow and shield gas flow according to the distribution of print liquid droplets.

It is thus a feature of at least one embodiment of the invention to greatly improve characterization of the printing process by direct imaging of the droplet field of the jet. To the extent that different droplet distributions may manifest themselves as similar problems with the printed line, knowledge of actual droplet distributions allows improved printer parameter adjustments not available when measuring the printed line only.

The aerosol jet printer may include a user interface communicating with the control system to output a measure of the distribution of droplet properties and receive inputs from a user controlling at least one of carrier gas flow and shield gas flow according to the output measure of the distribution of droplet properties.

It is thus a feature of at least one embodiment of the invention to provide improved information to the user for manual control of the printing process.

Alternatively, or in addition, the control system may implement a feedback control of at least one of carrier gas flow and shield gas flow according to the distribution of droplet properties.

It is thus a feature of at least one embodiment of the invention to permit improved feedback control of the complex aerosol jet printing process.

The control system may determine a distribution of velocity of the print liquid droplets in the jet providing a count of print liquid droplets within a set of different velocity ranges.

It is thus a feature of at least one embodiment of the invention to provide an accurate measurement of droplet print velocity variation such as may affect qualities such as line overspray or influence droplet size variations.

Alternatively, or in addition, the control system may determine a distribution of sizes of the print liquid droplets in the jet providing a count of print liquid droplets within a set of different size ranges.

It is thus a feature of at least one embodiment of the invention to provide an accurate measurement of droplet size variation, again which may affect overspray and line consistency.

In one embodiment, the atomizer may provide an ultrasonic transducer and the control system may further permit control of the ultrasonic transducer according to the distribution of print liquid droplets.

It is thus a feature of at least one embodiment of the invention to use the improved statistics available from direct observation of the particles in the jet to adjust the atomization process, for example, to produce a more uniform droplet size distribution.

The aerosol jet printer may, in some embodiments, include a particle-loading camera resolving print liquid droplets in the jet as it moves toward the substrate to determine particle loading in the droplets. In this case, the control system may determine a distribution of particle loading of droplets in the jet providing a count of droplets within a set of different of particle-loading ranges permitting control of the ultrasonic transducer according to the distribution of print liquid droplets.

It is thus a feature of at least one embodiment of the invention to provide an indication of variation in particle loading offering more insight than average particle loading for the control of the ultrasonic transducer and carrier gas.

The aerosol jet printer may further include a print liquid reservoir temperature controller allowing control of the print liquid temperature according to the distribution of particle loading in the print liquid droplets.

It is thus a feature of at least one embodiment of the invention to capture the relationship between print liquid temperature and droplet property distribution for improved process control.

The aerosol jet printer may further include a substrate camera resolving a printed line on the substrate after the jet strikes the substrate to determine line characteristics and wherein the control system further permits control of the carrier gas flow and shield gas flow according to the line characteristics.

It is thus a feature of at least one embodiment of the invention to combine jet characteristic measurements with line measurements for improved process control.

These particular objects and advantages may apply to only some embodiments falling within the claims and thus do not define the scope of the invention.

DETAILED DESCRIPTION OF THE PREFERRED EMBODIMENT

Figure 1:
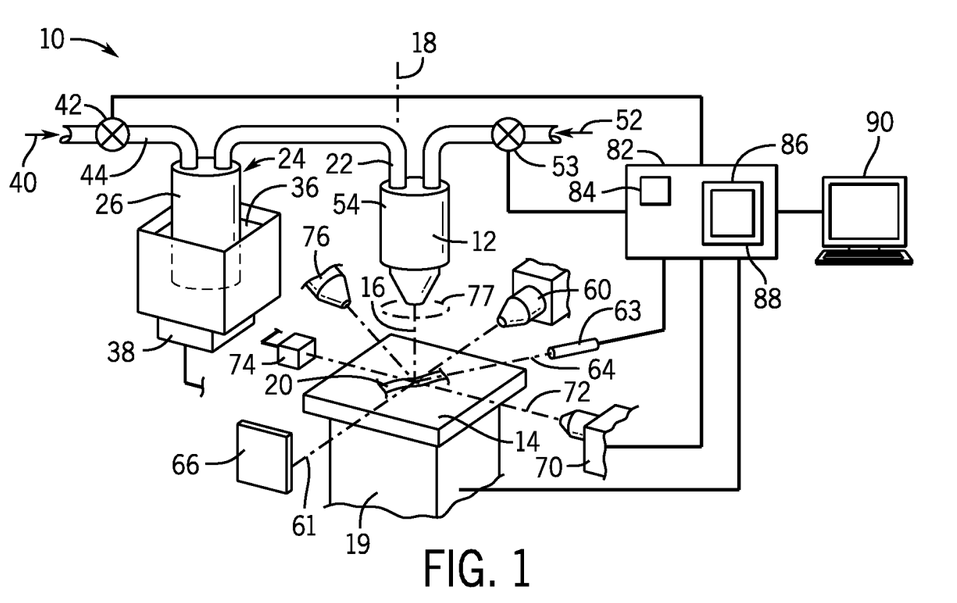
FIG. 1 is a perspective block diagram of an aerosol jet printer suitable for use with the present invention showing the location and orientation of three different cameras positioned with respect to an aerosol nozzle for monitoring the print jet and printed line and a central controller controlling multiple elements of the printer including ink temperature and carrier gas and shield gas flow.

Referring now to FIG. 1, an aerosol jet printer 10 may include a print head 12 positioned above a substrate 14 on which material will printed using a jet 16 of aerosolized print liquid 17. The aerosolized print liquid 17 is directed from the print head 12, generally along an axis 18 perpendicular to the broad extent of the substrate 14, while motion between the substrate 14 and the print head 12 is provided, for example, by an x-y-z table 19.

The x-y-z table may be of conventional design incrementally moving the substrate 14 controllably in three Cartesian axes having a z-axis aligned with axis 18, for example, using stepper or servo motors. This relative motion allows the jet 16 of aerosolized print liquid 17 to paint lines 20 on the substrate 14 describing arbitrary shapes and areas in two dimensions and, by building up material in multiple layers, arbitrary volumes in three dimensions.

Figure 2:
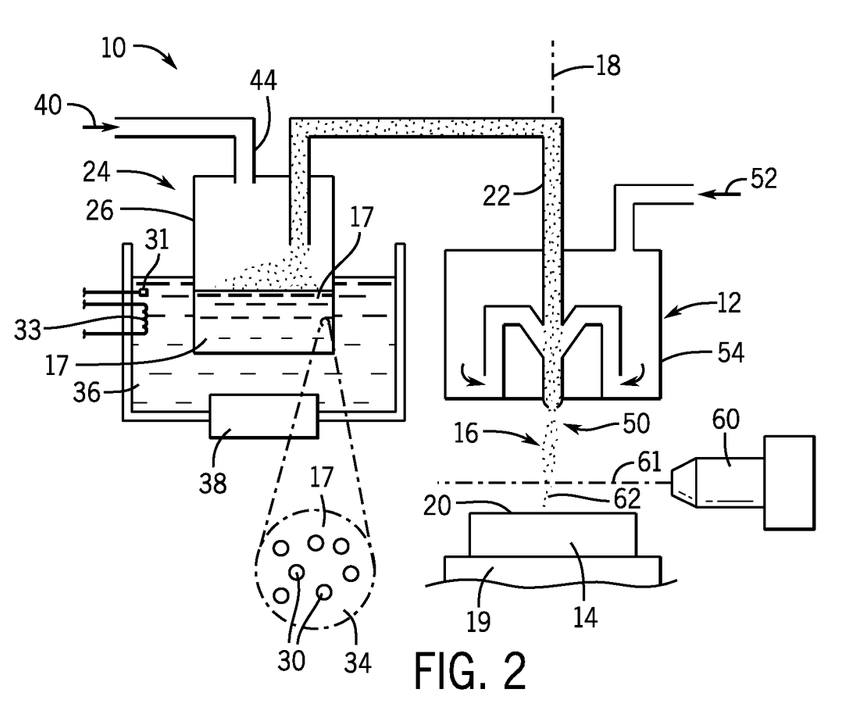
FIG. 2 is a simplified cross-sectional view of the atomizer and print nozzle of FIG. 1 showing the path of carrier gas and shield gas.

Referring also to FIG. 2, the print head 12 provides a central lumen 22 generally aligned along axis 18 that may receive aerosolized print liquid 17 from an atomizer 24, for example, the latter being a pneumatic atomizer or an ultrasonic atomizer as shown.

The ultrasonic atomizer provides a reservoir 26 holding a print liquid 17 generally comprised of a print material 30 in a suspending carrier liquid 34. Example print materials 30 include conductive material such as carbon or silver particles printing conductive electronic traces or the like, ceramic materials, and even biological matter such as proteins and strands of DNA.

The reservoir 26 may be immersed, for example, in a water bath 36 coupling the print liquid 17 acoustically with the ultrasonic transducer 38 serving, when the transducer is active, to generate a mist of aerosolized print liquid 17 above the surface of the non-aerosolized print liquid 17. A carrier gas 40 controlled by a valve 42 is introduced into the reservoir 26 through an inlet 44 that suspends and scavenges the aerosolized print liquid 17 and carries it down the central lumen 22 toward an exit orifice of print nozzle 50 of the print head 12.

The water bath 36 may communicate with a thermocouple or other temperature sensor 31 and a temperature control element 33 allowing control of the water temperature bath and hence the temperature of the print liquid 17. The temperature control element 33 may be a resistive heater or a Peltier device providing heating or cooling.

A sheath gas 52, controlled by a valve 53, may be introduced into a deposition head 54 around the central lumen 22 of the print head 12 to create a coaxial sheath of gas passing out of the exit orifice of the print nozzle 50 of the print head 12 in a ring around the aerosolized print liquid 17 to focus the jet 16. Generally, the ratio of the volume of the sheath gas 52 to the carrier gas 40 defines a focus ratio which may be adjusted by adjusting the volume flow of each of the carrier gas 40 and the sheath gas 52 as will be discussed below.

A high-speed high-resolution droplet imaging camera 60 having an optical axis 61 parallel to and positioned above the printed surface of the substrate 14 allows imaging of the jet 16 sufficient to freeze and resolve the individual droplets of the aerosolized print liquid 17 in rapidly acquired sequential images. The optical axis 61 is generally perpendicular to axis 18, and a focal plane 62 of the camera 60 provides sufficient depth of field to fully encompass the jet 16.

A laser 63 is positioned to direct a beam of light 64 in a frequency range of the camera 60 at an angle to the optical axis 61 of the imaging camera 60 to illuminate the jet 16 and its individual particles through backscatter. The laser 63 may be pulsed to "freeze" the droplets in the image in the manner of a stroboscope, allowing a wide variety of CCD type cameras to obtain successive images spaced apart by a few microseconds so that two images of a set of droplets at different times can be obtained within the field of view of the camera 60. The laser 63 and the camera 60 together provide a camera system producing the necessary images, although the invention contemplates other camera systems, for example, having continuous illumination and high-speed shutters or the like. For improved contrast, a light-absorbing background 66 may be placed opposite the camera 60 along the optical axis 61 and across the substrate 14.

An optional particle-loading camera 70 may be positioned to have an optical axis 72 orthogonal to the axis 61 to receive light from, for example, an infrared backlight 74. The particle loading camera 70 has a resolution in time and space comparable to camera 60 and is used for measuring light absorption by the droplets of the jets 16 to deduce particle loading, that is, the amount of print material 30 in the droplets 32.

A third optional print imaging camera 76 may be directed generally downwardly to the substrate 14 to provide imaging of the print line 20 for assessing that line quality as will be described below. Illumination for the third imaging camera 76 may be provided by a ring light 77 or the like centered about axis 18 to provide even illumination to the printed surface of the substrate 14.

A controller 82 having at least one processor 84 communicates with an electronic memory 86 holding a stored program 88, as will be discussed in more detail below, and operating to control the various components of the printer 10. The controller 82 may communicate with a control terminal 90, for example, including a graphic control screen keyboard and mouse and the like, allowing for user input and output as is generally understood in the art.

The controller 82 may receive signals from process sensors including the cameras 60, 70, and 76 (in the form of sequential image frames) as well as from the temperature sensor 31. In addition, the controller 82 may provide signals to control process variables, for example, the flow rate of the carrier gas 40 and sheath gas 52 (via valves 42 and 53) as well as the temperature control element 33. In addition, the controller 82 may provide control signals to the laser 63 and infrared backlight 74 for turning them on and off and signals to the x-y-z table 19 to maneuver it during the printing process to provide the desired print.

Figure 3:
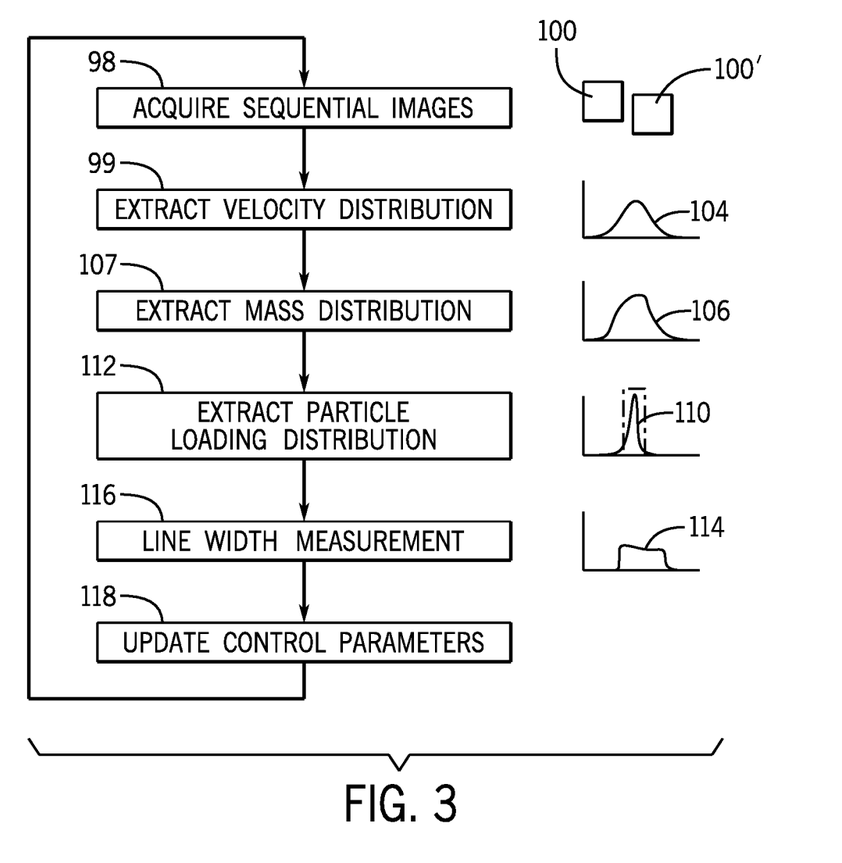
FIG. 3 is a flowchart of a first program executed by the controller to respond to the monitored print jet and print line in controlling the printing process.
Figure 4:
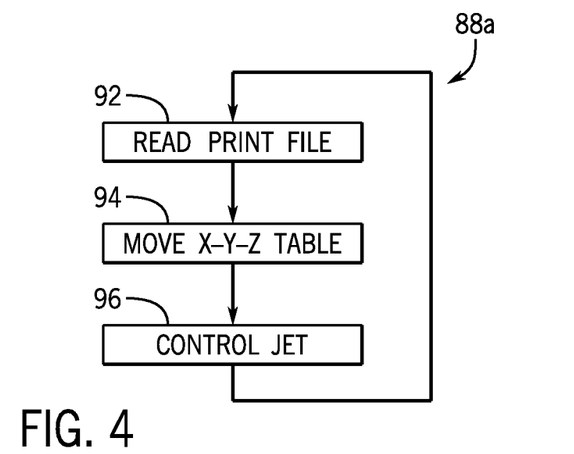
FIG. 4 is a flowchart of a second program operating concurrently with the first program to manage the printing process according to a printing file.

Referring now to FIGS. 3 and 4, generally the controller 82 will execute the program 88 to conduct two separate tasks. Task 88a (shown in FIG. 4) reads a data print file describing a volume or area to be printed as indicated by process block 92. Based on this data, the controller 82 provides control signals to the x-y-z table 19 per process block 94 to sequentially align different portions of the substrate with the jet 16. At each location, the computer controls the jet 16, for example, by modulating the carrier gas 40, to selectively deposit print liquid 17 on the substrate 14 in the desired pattern for the desired number of layers as indicated by process block 96.

A second task 88b (shown in FIG. 3) may be conducted simultaneously with task 88a or periodically as a process block in task 88a and serves to adjust the operation of the printer to improve the print line 20 with respect to desired line width, desired line density and consistency, line edge smoothness, and reduced overspray.

As indicated by process block 98, this process begins the acquisition of at least two sequential images 100 and 100' by camera 60 (shown superimposed in FIG. 5), with droplets of the first image 100 being denoted as 32 and droplets of the second image 100' being denoted as 32'. These two images are acquired so that a number of droplets 32 in the first image 100 will also be in the second image 100' (as droplets 32') given the average droplet velocity and the field-of-view of the camera 70. Each of the images 100 and 100' will resolve individual droplets 32 at the instances in time at a frame rate substantially eliminating motion blur.

Figure 5:
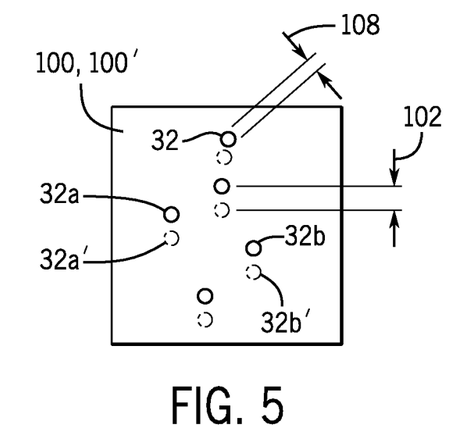
FIG. 5 is a simplified representation of successive, superimposed images by a jet-monitoring camera showing the extraction of droplet size and droplet velocity on a droplet-by-droplet basis.

For each pair of droplet images, for example, droplet images 32a and 32a, a droplet velocity may be determined by measuring a distance 102 between the centers of the droplet images 32a and 32a' divided by the known time between the capture of images 100 and 100'. Velocities for each droplet 32 may be collected together to produce a velocity distribution 104 and, as indicated by process block 99, describe the statistics of the velocities of all the droplets 32 common within the field-of-view of the images 100 and 101' in the manner of a histogram. This velocity distribution 104 provides a variety of statistical measures including average velocity and velocity spread, for example, measured by standard deviations.

Referring still to FIG. 3, each pair of images 100 and 100' may also yield a mass distribution 106 per process block 107 which, like velocity distribution 104, describes the statistics of the masses of all the droplets in the common field-of-view of the images 100 and 100', wherein mass is deduced from a diameter 108 of the droplet 32 under the assumption of a spheroidal volume and an assumed density of loading of the print liquid 17 in the droplets 32 (as may be modified as discussed further below).

Together the velocity measurements and mass measurements can provide a mass flow rate distribution and its statistics, including average mass flow rate and mass flow rate spread. This measure may prove important in ensuring a desired density of the print line 20 for a given print speed.

Figure 6:
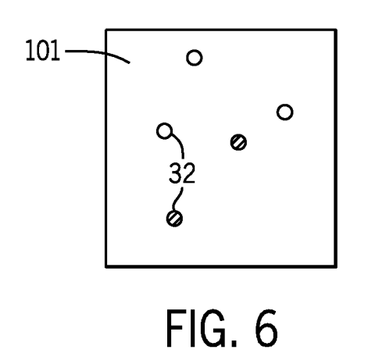
FIG. 6 is a simplified representation of an image by a particle-loading camera showing monitoring of particle loading on a droplet-by-droplet basis.

Referring to FIG. 6, an image 101 having a similar field-of-view to images 100 and 100' may be captured by the print loading camera 70. This image 101 may be used to assess the print load of each droplet being the amount of print material 30 within the liquid 34, expressed either in an absolute amount or density. Such an assessment is based on a transmission of infrared light through the droplet 32, normalized, for example, to the droplet size and weighted according to empirically derived properties of the print liquid 17. This information may be used provide a print-loading distribution 110 indicating the statistics of material in the droplets 32 per process block 112, such statistics allowing control of the atomization process to provide a desired print loading and to reduce variations in print loading among droplets 32.

Figure 7:
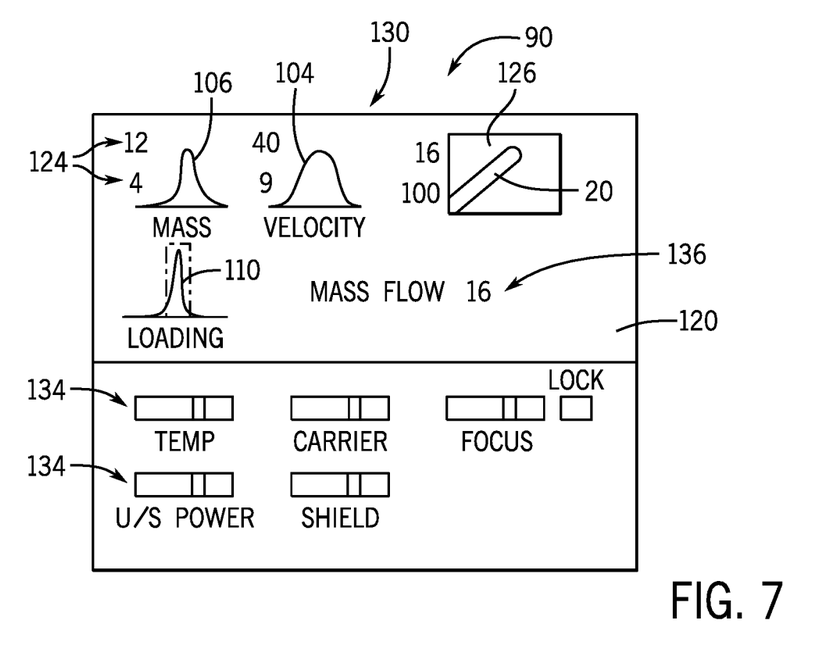
FIG. 7 is an example display screen allowing adjustment of various parameters of the aerosol jet printer based on statistics extracted by the controller from the jet monitoring camera images.

Referring now to FIGS. 1 and 7, per process block 116, camera 76 may be positioned to capture successive images 126 of a print line 20 printing on the substrate 14 by the jet 16. These images 126 may be used to assess various qualities of that print line 20 including line width, overspray, and line consistency (whether its optical density changes appreciably over its length). In this regard, image 126 is processed using conventional machine imaging techniques to produce one or more quantitative values, for example, a width distribution 114 which may also provide information for the control of the printer 10.

Referring now to FIGS. 3 and 7, the information collected per process blocks 99, 107, 112, and 116 may be used for improved control of the printer 10 per process block 118. In one embodiment, this information may be provided visually to a user on a user screen 120, for example, showing the various distributions 104 106 and 110 in histogram form and providing relevant quantitative statistics 124 such as peak value of the distribution and width of the distribution (for example, in standard deviations). In addition, the image 126 from the line camera 70 may be displayed together with the extracted quantitative statistics 130 such as line width, overspray amount, and line consistency.

In this embodiment, the user may also be presented with various composite statistics 132, for example, mass flow, deduced from the velocity and measured mass or size of the droplets 32 as discussed above.

The display screen 120 may provide a set of controls 134 (for example, graphically depicted sliders) allowing the user to set the various control variables of the printer 10 including temperature of the print liquid, carrier gas flow rate, shield gas flow rate, or alternatively focus ratio (a ratio of carrier gas to shield gas) as well as ultrasound power to the transducer 38. In this way adjustment of the printer 10 may be performed interactively.

Figure 8:
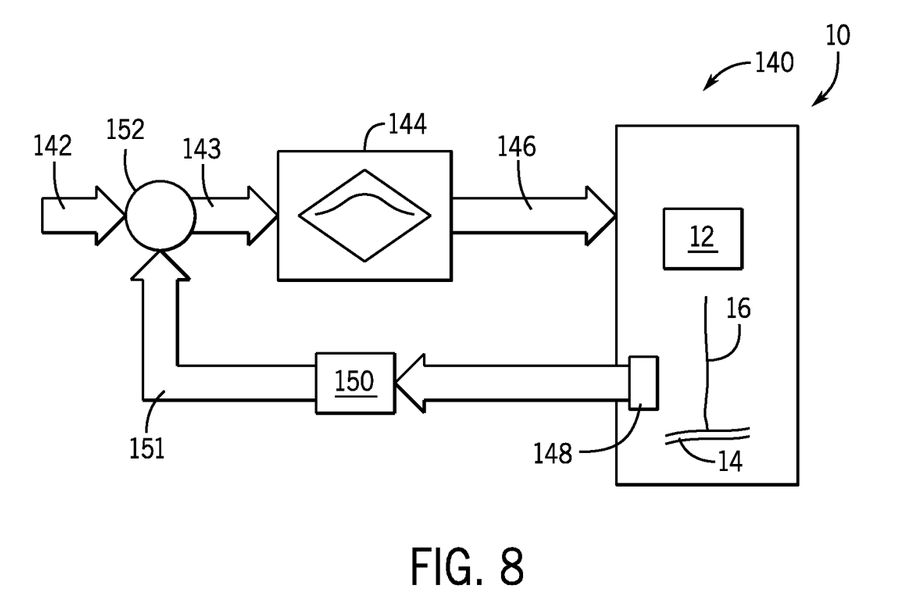
FIG. 8 is a block diagram of a feedback control system making use of direct monitoring of the droplet characteristics of the print jet for automatic process control.

Alternatively, and referring to FIG. 8, the invention contemplates that the statistical information obtained from the jet camera 60 and particle-loading camera 70 and line camera 76 may be used directly in a feedback control system 140 implemented on the controller 82. In this embodiment, droplet field statistics related to the various distributions 104, 106, 110, as well as the statistics from the line camera 76 and the water bath temperature from sensor 31, are provided as setpoints 142 by the user. An error signal 143 derived from the setpoints, using a summing block 152, is then provided to a proportional-integral (PI) controller 144. The controllable parameters, for example, including carrier gas flow rate, shield gas flow rate, print liquid temperature, and ultrasound power will be automatically modulated using the PI controller to minimize the error signal 143 to a defined minimum. The relationships between the droplet field statistics and the controllable parameters are derived experimentally and used by process block 150 to provide feedback signal 151 derived from the droplet field statistics and sent to the summing block producing the error signal 143. These control variable values will be used to control the aerosol jet printer 10 (through valves 42, 53, and temperature control element 33 as discussed above).

During the control process, sensing information 148 from the cameras 60, 70, 76 and temperature sensor 31 may be statistically processed per process block 150, as discussed above, extracting distributions 104, 106, 110 and line information 114, and these statistics 151, generally corresponding in category to the information of the setpoints 142, fed back to the summing block 152 to produce the error signal 143.

It will generally be understood that a wide variety of other control strategies may be adopted using the statistics 151, for example, replacing the multivariable regression 144 with a trained neural network or the like. Generally, these techniques contemplate a set of experiments to determine a regression or a training set for artificial intelligence techniques.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An aerosol jet printer comprising:
   a print liquid reservoir holding a liquid to be printed;
   an atomizer receiving a carrier gas and the liquid to be printed to provide an aerosol of the print liquid having print liquid droplets in the carrier gas;
   a substrate;
   a print nozzle movable with respect to the substrate and receiving the aerosol and a shield gas, the print nozzle directing the aerosol toward a substrate as a jet as enveloped by the shield gas;
   a droplet field camera system resolving print liquid droplets in the jet as it moves toward the substrate; and
   a control system controlling a flow of aerosol and shield gas and the movement of the print nozzle with respect to the substrate and receiving a set of images from the droplet field camera system to determine at least one of a velocity and mass distribution of print liquid droplets to permit control of at least one of the carrier gas flow and shield gas flow according to the distribution of print liquid droplets.

2. The aerosol jet printer of claim 1 further including a user interface communicating with the control system to output a measure of the distribution of droplet properties and receive inputs from a user controlling at least one of carrier gas flow and shield gas flow according to an outputted measure of the distribution of droplet properties.

3. The aerosol jet printer of claim 1 wherein the control system further implements a feedback control of at least one of carrier gas flow and shield gas flow according to the distribution of droplet properties.

4. The aerosol jet printer of claim 1 wherein the control system determines a distribution of velocity of the print liquid droplets in the jet providing a count of print liquid droplets within a set of different velocity ranges.

5. The aerosol jet printer of claim 1 wherein the control system determines a distribution of sizes of the print liquid droplets in the jet providing a count of print liquid droplets within a set of different size ranges.

6. The aerosol jet printer of claim 1 further including a print liquid reservoir temperature controller; and
wherein the control system further permits control of the print liquid reservoir temperature controller according to the distribution of particle loading in the print liquid droplets.

7. The aerosol jet printer of claim 1 further including a substrate camera system resolving a printed line on the substrate after the jet strikes the substrate to determine line characteristics; and
wherein the control system further permits control of the carrier gas flow and shield gas flow according to the line characteristics.

8. An aerosol jet printer comprising:
a print liquid reservoir holding a liquid to be printed;
an atomizer receiving a carrier gas and the liquid to be printed to provide an aerosol of the print liquid having print liquid droplets in the carrier gas;
a substrate;
a print nozzle movable with respect to the substrate and receiving the aerosol and a shield gas, the print nozzle directing the aerosol toward a substrate as a jet as enveloped by the shield gas;
a droplet field camera system resolving print liquid droplets in the jet as it moves toward the substrate; and
a control system controlling a flow of aerosol and shield gas and the movement of the print nozzle with respect to the substrate and receiving a set of images from the droplet field camera system to determine the distribution of print liquid droplet properties to permit control of at least one of the carrier gas flow and shield gas flow according to the distribution of print liquid droplets;
further including a particle-loading camera system resolving print liquid droplets in the jet as it moves toward the substrate to determine particle loading in the droplets;
wherein the control system determines a distribution of particle loading of droplets in the jet providing a count of droplets within a set of different particle-loading ranges to permit control of at least one of the carrier gas flow and shield gas flow according to the distribution of print liquid droplets;
further including a particle-loading camera system resolving print liquid droplets in the jet as it moves toward the substrate to determine particle loading in the droplets; and wherein the control system determines a distribution of particle loading of droplets in the jet providing a count of droplets within a set of different particle-loading ranges to permit control of at least one of the carrier gas flow and shield gas flow according to the distribution of print liquid droplets.

9. The aerosol jet printer of claim 8 where the atomizer further includes an ultrasonic transducer, and wherein the control system determines the distribution of particle loading of the droplets to permit control of the ultrasonic transducer according to the distribution of print liquid droplets.

10. A method of operating an aerosol jet printer of the type having:
a print liquid reservoir holding a liquid to be printed;
an atomizer receiving a carrier gas and the liquid to be printed to provide an aerosol of the print liquid having print liquid droplets in the carrier gas;
a substrate;
a print nozzle movable with respect to the substrate and receiving the aerosol and a shield gas, the print nozzle directing the aerosol toward a substrate as a jet as enveloped by the shield gas; and
a droplet field camera system resolving print liquid droplets in the jet as it moves toward the substrate; the method including:
(a) analyzing a set of images from the droplet field camera system to determine distribution of print liquid droplet properties; and
(b) controlling at least one of the carrier gas flow and shield gas flow according to at least one of a mass and velocity distribution of print liquid droplets.

11. The method of claim 10 wherein the aerosol jet printer further includes a user interface communicating with the control system to output a measure of the distribution of droplet properties and receive inputs from a user, and wherein the control of at least one of carrier gas flow and shield gas flow is according to the inputs from the user.

12. The method of claim of 10 wherein the control of at least one of carrier gas flow and shield gas flow is according to an automatic feedback control system accepting as a feedback signal statistics describing the distribution of droplet properties.

13. The method of claim 10 wherein the distribution of print liquid droplet properties provides a count of print liquid droplets within a set of different velocity ranges.

14. The method of claim 10 wherein the distribution of print liquid droplet properties provides a count of print liquid droplets within a set of different size ranges.

15. The method of claim 10 wherein the aerosol jet printer further includes a print liquid reservoir temperature controller; and wherein the control system further permits control of the print liquid reservoir temperature controller according to the distribution of particle loading in the print liquid droplets.

16. The method of claim 10 wherein the aerosol jet printer further includes a substrate camera system resolving a printed line on the substrate after the jet strikes the substrate to determine line characteristics; and wherein the control system further permits control of the carrier gas flow and shield gas flow according to the line characteristics.

17. A method of operating an aerosol jet printer of the type having:
a print liquid reservoir holding a liquid to be printed;
an atomizer receiving a carrier gas and the liquid to be printed to provide an aerosol of the print liquid having print liquid droplets in the carrier gas;

a substrate;

a print nozzle movable with respect to the substrate and receiving the aerosol and a shield gas, the print nozzle directing the aerosol toward a substrate as a jet as enveloped by the shield gas; and a droplet field camera system resolving print liquid droplets in the jet as it moves toward the substrate; the method including:

(a) analyzing a set of images from the droplet field camera system to determine distribution of print liquid droplet properties; and (b) controlling at least one of the carrier gas flow and shield gas flow according to the distribution of print liquid droplets, wherein the aerosol jet printer further includes a particle-loading camera system resolving print liquid droplets in the jet as it moves toward the substrate to determine particle loading in the droplets; and wherein the control system determines a distribution of particle loading of droplets in the jet providing a count of droplets within a set of different particle-loading ranges to permit control of at least one of the carrier gas flow and shield gas flow according to the distribution of print liquid droplets.

18. The method of claim 17 wherein the atomizer further includes an ultrasonic transducer and wherein the control system determines the distribution of particle loading of the droplets to permit control of the ultrasonic transducer according to the distribution of print liquid droplets.

* * * * *